(12) United States Patent
Holdaway

(10) Patent No.: US 11,059,990 B2
(45) Date of Patent: Jul. 13, 2021

(54) ANTI-FOULING COATINGS

(71) Applicant: MetaShield LLC, New York, NY (US)

(72) Inventor: Jerrett A. Holdaway, Boise, ID (US)

(73) Assignee: Metashield LLC, New York, NY (US)

( * ) Notice: Subject to any disclaimer, the term of this patent is extended or adjusted under 35 U.S.C. 154(b) by 11 days.

(21) Appl. No.: 16/592,495

(22) Filed: Oct. 3, 2019

(65) Prior Publication Data
US 2020/0115583 A1 Apr. 16, 2020

Related U.S. Application Data

(60) Provisional application No. 62/745,824, filed on Oct. 15, 2018.

(51) Int. Cl.
| | | |
|---|---|---|
| *C09D 143/02* | (2006.01) | |
| *C09D 127/12* | (2006.01) | |
| *C09D 143/04* | (2006.01) | |
| *C09D 147/00* | (2006.01) | |
| *C08K 5/06* | (2006.01) | |
| *C09D 5/16* | (2006.01) | |
| *B05D 3/06* | (2006.01) | |
| *C09D 133/14* | (2006.01) | |
| *C08L 27/12* | (2006.01) | |

(52) U.S. Cl.
CPC ........... *C09D 143/02* (2013.01); *B05D 3/067* (2013.01); *C08K 5/06* (2013.01); *C09D 5/16* (2013.01); *C09D 127/12* (2013.01); *C09D 133/14* (2013.01); *C09D 143/04* (2013.01); *C09D 147/00* (2013.01); *C08L 27/12* (2013.01); *C08L 2201/10* (2013.01); *C08L 2205/02* (2013.01); *C08L 2205/05* (2013.01)

(58) Field of Classification Search
CPC .. C09D 127/12; C09D 141/00; C09D 143/02; C08F 220/22; C08F 220/2438; C08F 220/24; C08F 220/38; C08F 220/382; C08F 228/02; C08F 230/02
See application file for complete search history.

(56) References Cited

U.S. PATENT DOCUMENTS

| | | | |
|---|---|---|---|
| 4,198,465 A | 4/1980 | Moore et al. | |
| 5,426,131 A | 6/1995 | Katsamberis | |
| 6,440,519 B1 | 8/2002 | Takase et al. | |
| 7,173,778 B2 | 2/2007 | Jing et al. | |
| 2009/0291222 A1* | 11/2009 | Qiu | C08F 220/34 427/427.4 |
| 2011/0217541 A1* | 9/2011 | Shimano | G02B 1/105 428/323 |
| 2016/0002377 A1* | 1/2016 | Chang | C08F 220/24 524/714 |
| 2016/0159952 A1* | 6/2016 | Guillemot | C09D 5/00 428/421 |
| 2018/0305482 A1* | 10/2018 | Savu | C08F 214/182 |
| 2019/0233564 A1* | 8/2019 | Kijima | C08F 220/32 |
| 2020/0199276 A1* | 6/2020 | Uehata | C08L 33/16 |

FOREIGN PATENT DOCUMENTS

| | | |
|---|---|---|
| CN | 104277518 A | 1/2015 |
| EP | 2842989 A1 | 3/2015 |
| JP | 2015-091927 * | 5/2015 |
| KR | 20080108755 A | 12/2008 |
| WO | WO 2019/022049 * | 1/2019 |

OTHER PUBLICATIONS

Machine-translation of JP 2015-091927 (no date).*
Mashouf, G et al., UV curable urethane acrylate coatings formulation: experimental design approach. Pigment & Resin Technology, vol. 43, pp. 61-68. Nov. 2, 2014; abstract; p. 62, col. 2, second and fourth paragraphs.
Kyoeisha chemical. "Light Ester P-2M." Dec. 18, 2017. [Retrieved from the internet on Nov. 13, 2019]. <URL: https://adhesives.specialchem.com/product/m-kyoeisha-chemical-light-ester-p-2m>; p. 1.
USPTO as International Searching Authority, "International Search Report and Written Opinion", for application No. PCT/US2019/054647, dated Dec. 13, 2019.

* cited by examiner

*Primary Examiner* — Marc S Zimmer
(74) *Attorney, Agent, or Firm* — Dentons DJP; Sarah W. Matthews; Brick Power

(57) ABSTRACT

A UV curable composition for forming a polymeric coating on a substrate as described may include an optically clear colorless UV curable base comprising a combination of one or more multifunctional polymer precursor and a fluorinated polymer precursor. One or more of the multifunctional polymer precursor and fluorinated polymer precursor may comprise a non-charged electrically conductive site sufficient to disperse a static charge from the surface of the polymeric coating.

19 Claims, No Drawings

ANTI-FOULING COATINGS

TECHNICAL FIELD

The present disclosure relates to coatings which may be used to protect surfaces. More specifically, the disclosure relates to a UV-curable composition with one or more multifunctional polymer precursors and/or a fluorinated polymer precursor with a non-charged electrically conductive site to disperse a static charge.

BACKGROUND

Various surfaces (such as containers, appliances, glass windows, etc.) suffer from the problem of fouling from fingerprints, make-up, hard water spots, permanent markets, chemicals, and the like, marring the appearance of the surface over the course of usage by the end user.

SUMMARY

Disclosed herein are ultraviolet (UV) cured acrylate-based formulations that significantly improve the anti-fouling and chemical resistance properties and appearance of substrate surfaces, while maintaining or improving the important properties of hardness, abrasion resistance, and smooth defect-free appearance, etc. The formulations may be used as coatings on surfaces such as containers, appliances, electronic devices, glass windows, consumer products, etc.

According to one aspect, the UV curable composition may comprise: an optically clear colorless UV curable base comprising a combination of one or more multifunctional polymer precursor and a fluorinated polymer precursor; wherein one or more of the multifunctional polymer precursor and fluorinated polymer precursor has a non-charged electrically conductive site sufficient to disperse a static charge from the surface of the polymeric coating.

In some configurations, the UV curable base is an acrylate monomer. The non-charged electrically conductive site may be chosen from a phosphate group or a sulfate group, or a combination thereof.

According to one aspect, the one or more multifunctional polymer precursor may be a diacrylate monomer. The diacrylate monomer may be, for example, chosen from at least one of bis[2-(methacryloyloxy)ethyl phosphate]; 2-[hydroxy(2-prop-2-enoyloxyethoxy)phosphoryl]oxyethylprop-2-enoate; phosphinylidynetris(oxyethylene) triacrylate; 2-(2-methylprop-2-enoyloxy)ethoxy-oxido-oxophosphanium; 2-sulfoethyl acrylate, 2-sulfoethyl methacrylate; and 2-[2-(methacryloyloxy)ethylsulfonyl]acetic acid.

According to another aspect, the multifunctional polymer precursor may include at least one of a diacrylate, triacrylate and tetraacrylate. In some configurations, a diacrylate monomer is present at a concentration of from greater than 0% to about 50% by weight of the total composition; a triacrylate monomer is present at a concentration of from greater than 0% to about 90% by weight of the total composition; and a fluorinated acrylate monomer is present at a concentration of from greater than 0% to about 20% by weight of the total composition. More specifically, a diacrylate monomer may be present at a concentration of from about 0.5% to about 35% by weight of the total composition; a triacrylate monomer is present at a concentration of from about 10% to about 65% by weight of the total composition; and a fluorinated acrylate monomer is present at a concentration of from greater than about 0.5% to about 5% by weight of the total composition. Even more specifically, a diacrylate monomer is present at a concentration of from greater than 15% to about 25% by weight of the total composition; a triacrylate monomer is present at a concentration of from greater than 40% to about 50% by weight of the total composition; and a fluorinated acrylate monomer is present at a concentration of from greater than 0.5% to about 2% by weight of the total composition.

According to another aspect, the UV curable composition may include an adhesion promoter compound having a siloxane group and an acrylate group. The adhesion promoter, for example, may be chosen from 3-(trimethoxysilyl)propyl acrylate, 3-(acryloyloxy)propyltriethoxysilane, methacryloxypropyltriisopropoxysilane, or 3-(trimethoxysilyl)propyl methacrylate, or combinations thereof, in an aqueous acid solution. The composition may also include one or more oxygen scavengers.

According to yet another aspect, the UV curable composition may further comprise a solvent, the solvent comprising at least one of a propylene glycol methyl ether, ethanol, acetone, and isopropanol. The solvent may be, for example, propylene glycol monomethyl ether acetate (PGMEA). According to one aspect, the solvent may be present at a concentration ranging from about 37% to about 51% by weight of a total uncured composition.

According to another aspect, the coating may have a thickness of from about 3 microns to about 6 microns and a pencil hardness of greater than about 4H. In some configurations, the coating has a thickness of about 6 microns and a pencil hardness of greater than about 8H on a glass substrate.

According to yet another aspect, a UV curable composition may comprise about 25 to about 35 percent by weight trimethylol propane triacrylate, about 15 to about 55 percent by weight propylene glycol monomethyl ether acetate, about 10 percent to about 15 percent by weight bis[2-(methacryloyloxy)ethyl phosphate], about 0.5 to about 4 percent by weight 2,2-diethoxyacetophenome, about 0.5 percent to about 2 percent by weight fluorAcryl 7298, about 0.2 to about 2 percent by weight TEGO Flow 460N and about 2 to about 6 percent by weight pentaerythritol tetraacrylate.

In yet a further aspect, a method of forming a coating may comprise: mixing a diacrylate monomer, a triacrylate monomer, a fluorinated acrylate monomer, and a solvent, wherein: the diacrylate monomer is in a concentration of from greater than 0% to about 50% by weight of the total composition; the triacrylate monomer is present at a concentration of from greater than 0% to about 90% by weight of the total composition; and the fluorinated acrylate monomer is present at a concentration of from greater than 0% to about 20% by weight of the total composition. The mix of solvent and monomers may then be coated onto a surface and exposed to UV light.

DETAILED DESCRIPTION

Definitions

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

As used herein, the term "about" modifying the quantity of a component or ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. The term "about," when used in reference to the concentration of an ingredient of a composition, also encompasses concentration amounts that result in substantially similar functional properties of the overall composition. Whether or not modified by the term "about," the claims include equivalents to the quantities.

The term "multi-functional acrylate resin" means a high molecular weight polyacrylate comprised of one or more polyacrylate monomers having a plurality of functional bonding sites. The multi-functional acrylate resin resulting from the cross-linking of such monomers provides a toughened coating that effectively increases the break-resistance of tempered glass.

The term "photoinitiator" means compounds or compositions that generate free radicals upon photoirradiation to induce polymerization of acrylates through the transfer of free radicals.

The term "polymer precursor" means a monomer or system of monomers that have been reacted to an intermediate molecular mass state, which is capable of further polymerization by reactive groups to a fully cured high molecular weight state. Mixtures of reactive polymers with un-reacted monomers may also be referred to as "polymer precursors."

Multifunctional Acrylates

The UV curable coating compositions described herein, which may also be referred to as "photopolymerizable coatings" and as "coating compositions," may comprise organic multi-functional acrylate monomers as the polymerization units. These multi-functional monomers undergo a polymerization reaction with each other, and the degree of crosslinking can be enhanced imparting improved hardness, break resistance or impact resistance to the substrate.

In some embodiments disclosed herein, the UV curable compositions comprise one or more photocurable acrylate or methacrylate monomers or copolymers, which react to form a polymeric matrix having high surface hardness and high crosslinking density of coatings. In some embodiments, the UV curable coating composition comprises one or more multi-functional acrylate monomers selected from a di-functional, tri-functional, and tetra-functional acrylate monomers, and mixtures thereof. In other embodiments, the UV curable coating composition comprises one or more multi-functional acrylate monomers or combinations thereof wherein at least one of the multi-functional acrylate monomers is a tri-functional acrylate monomer.

The UV curable coating compositions disclosed herein may include free radically polymerizable monomers, oligomers, and polymers having one or more ethylenically unsaturated acrylic groups. Suitable compounds contain at least one ethylenically unsaturated bond and are capable of undergoing addition polymerization. Examples of useful ethylenically unsaturated acrylate compounds include acrylic acid esters, methacrylic acid esters, hydroxy-functional acrylic acid esters, hydroxy-functional methacrylic acid esters, and combinations thereof.

As used herein, the term acrylate and acrylic refer to the same chemical functionality. The word "meth" in brackets, such as "(meth)," associated with the term acrylate, specifies that, relating to a molecule or to a family of molecules, the acrylate function $H_2C=CHCO_2R$ could have a methyl group at a position of the ethylene function, such as $H_2C=C(CH_3)CO_2R$, where R is a hydrogen or any other suitable organic group. Thus, the term (meth)acrylate refers to both the acrylate (without the methyl group at the position of the ethylene function) and methacrylate variants of the monomer (with the methyl group at the position of the ethylene function).

The UV curable coating compositions may also comprise monomers having hydroxyl groups and ethylenically unsaturated groups in a single molecule. Examples of such materials include hydroxyalkyl (meth)acrylates, such as 2-hydroxyethyl (meth)acrylate and 2-hydroxypropyl (meth)acrylate; glycerol mono- or di-(meth)acrylate; trimethylolpropane mono- or di-(meth)acrylate; pentaerythritol mono-, di-, and tri-(meth)acrylate; sorbitol mono-, di-, tri-, or tetra-(meth)acrylate; and 2,2-bis[4-(2-hydroxy-3-ethacryloxypropoxy)phenyl]propane (bis-GMA), ("bis-GMA" refers to bisphenol A-glycidyl methacrylate). Suitable ethylenically unsaturated compounds are available from a wide variety of commercial sources, such as Sigma-Aldrich, St. Louis.

The (meth)acrylate may be multifunctional, meaning that they can be di-functional, tri-functional, or tetra-functional, or combinations thereof. Typically, the higher the functionality, the greater is the crosslink density. (Meth)acrylates have slower curing rates compared to acrylates. In some embodiments, the multi-functional acrylate compositions are made from unsaturated acrylates. The multi-functional oligomer may be of any suitable molecular weight so long as it does not impart excessive viscosity to the UV curable coating composition that would impair application or quality of appearance when applied to a substrate. In some embodiments, the specific viscosity of the monomer composition enables the solution to be sprayed in standard industrial grade spraying devices.

The UV curable acrylates may have two, three, or four (meth)acrylic functional groups. For example, suitable di(meth)acrylates, or "diacrylates," may include tetraethyleneglycol diacrylate, ethyleneglycol diacrylate, diethyleneglycol di(meth)acrylate, triethyleneglycol diacrylate, hexanediol diacrylate, 1,6-hexanediol di(meth)acrylate, ethoxylated 1,6-hexanediol diacrylate, tripropylene glycol diacrylate, ethoxylated dipropylene glycol diacrylate, tricyclodecane dimethanol diacrylate, dipropyleneglycol diacrylate, ethyleneglycol dimethacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, 1,4-butanediol diacrylate, 1,4 butanediol dimethacrylate, neopentyl glycol diacrylate, cyclohexanedimethanol diacrylate, dipropylene glycol diacrylate, polypropylene glycol diacrylate, allylated cyclohexyl dimethacrylate, isocyanurate dimethacrylate, tris(acryloxyethyl)isocyanurate, and the like, and mixtures of two or more thereof. In some embodiments, the di(meth)acrylate monomer is bis[2-(methacryloyloxy)ethyl phosphate].

Suitable tri(meth)acrylates may include pentaerythritol triacrylate, trimethylolethane triacrylate, trimethylolethane triacrylate, trimethylolpropane triacrylate, ethoxylated trimethylolpropane triacrylate, trimethylol propane trimethacrylate, propoxylated trimethylolpropane triacrylate, trisphenol triacrylate, triphenylolmethane triacrylate, tetraphenylol ethane triacrylate, 1,2,6-hexanetriol triacrylate, 1,2,4-butanetriol trimethacrylate, tris(2-hydroxyethyl) isocyanurate triacrylate, glycerol triacrylate, diglycerol triacrylate, glycerol ethoxylate triacrylate, glycerine propoxylated triacrylate, tris(2-hydroxy ethyl)isocyanurate triacrylate, and the like, and mixtures of two or more thereof. In some embodiments, the triacrylate is trimethylolpropane triacrylate.

Suitable tetra(meth)acrylates may include pentaerythritol tetraacrylate, di-trimetholpropane tetraacrylate, ethoxylated trimethylol propane trimethacrylate, ethoxylated pentaerythritol tetraacrylate, propoxylated pentaerythritol tetraacrylate, propoxylated glycerol trimethacrylate, and the like, and mixtures of two or more thereof.

Mixtures of two or more free radically polymerizable di(meth)acrylate, tri(meth)acrylate and tetra(meth)acrylate compounds described above can be used if desired. For example, in some embodiments, the acrylate component of the composition includes the multifunctional acrylates bis[2-(methacryloyloxy)ethyl phosphate] and trimethylolpropane triacrylate (TMPTA). In other embodiments, the acrylate component of the composition includes the multifunctional acrylates bis[2-(methacryloyloxy)ethyl phosphate], trimethylolpropane triacrylate (TMPTA) and pentaerythritol tetraacrylate.

In some embodiments, the di(meth)acrylate may be present in a concentration range of from greater than about 0% to about 50% by weight of the total uncured UV curable coating composition. In other embodiments, the di(meth)acrylate may be present in a concentration range of from about 0.5% to about 35% by weight of the total uncured UV curable coating composition. In other embodiments, the di(meth)acrylate may be present in a concentration range of from about 15% to about 25% by weight of the total uncured UV curable coating composition. In some embodiments, the di(meth)acrylate may be present in a concentration range of from about 2.98% to about 30.04% by weight of the total uncured UV curable coating composition. In other configurations, the di(meth)acrylate may be present in a concentration of about 20.98% by weight of the total uncured UV curable coating composition.

In some embodiments, the tri(meth)acrylate may be present in a concentration range of from greater than about 0% to about 90% by weight of the total UV curable coating composition. In other embodiments, the tri(meth)acrylate may be present in a concentration range of from about 10% to about 65% by weight of the total uncured UV curable coating composition. In other embodiments, the tri(meth)acrylate may be present in a concentration range of from about 40% to about 50% by weight of the total uncured UV curable coating composition. In other embodiments, the tri(meth)acrylate may be present in a concentration range of from about 26.19% to about 70.65% by weight of the total UV curable coating composition. In another embodiments, the tri(meth)acrylate may be present in a concentration of about 49.39% by weight of the total uncured UV curable coating composition.

In some embodiments, the tetra(meth)acrylate monomer may be present in the UV curable coating composition at a concentration ranging from greater than 0% to about 90% by weight of the total uncured UV curable coating composition. In some embodiments, the tetra(meth)acrylate monomer may be present at a concentration ranging from about 0% to about 6.51% by weight of the total uncured UV curable coating composition. In some embodiments, the tetra(meth)acrylate monomer may be present at a concentration ranging from about 4.15% to about 6.51% by weight of the total uncured coating composition.

Fluorinated Acrylates

The UV-curable coating compositions described herein may include a plurality of different multi-functional acrylates, as described above, and a fluorinated acrylate. In some embodiments, the UV-curable coating compositions comprise three different acrylates, such as a triacrylate, a diacrylate, and a fluorinated acrylate.

The fluorinated acrylate may function to repel water, as well as oily or fatty substances, such as finger prints, that comprise lipid molecules (fatty acids) with long carbon tails (e.g., 16-20+ carbons long) with a carboxylic acid (—COOH) group at one end. Numerous fluorinated acrylate compounds are known and commercially available, such as Fluoracryl 7298® (Cytonix, USA) and Optool HP-DAC® (Daikin Industries, Japan). FluorAcryl 7298® may be included at concentrations ranging from about 0.5% to about 3% by weight of the total uncured UV curable coating composition. FluorAcryl 7298® is a long chain fluorinated polymer that has acrylate functionality, which allows it to cure directly into the coating. HP-DAC® can be substituted for FluorAcryl 7298® at similar concentrations.

In some configurations, the fluorinated acrylate may be present in a concentration ranging from greater than about 0% to about 20% by weight of the total uncured UV curable coating composition. More specifically, the fluorinated acrylate may be present in a concentration ranging from greater than about 0.5% to about 5% by weight of the total uncured UV curable coating composition. Even more specifically, the fluorinated acrylate may be present in a concentration ranging from greater than about 0.5% to about 2% by weight of the total uncured UV curable coating composition.

Acrylate Conductive Sites

Fluorinated acrylates may cause static electricity, or a static charge, to build up in a UV curable coating composition. More specifically, the fluorine of fluoroacrylate compounds may impart the reacted fluoroacrylates with a negative (or sometimes positive) electrical charge, which may enable static electricity to build up in the cured coating during use. Conventionally, the buildup of static electricity in a composition has been addressed by including anti-static additives in the composition. Commonly used anti-static additives include, for example, conductive grade carbon black, metal fillers, and ionic surfactants; however, these anti-static additives generally cause the final coating to have a very dark appearance and vastly reduce transparency and/or migrate out of the coating over time and lose their anti-static properties. To avoid these disadvantages, the acrylates of the UV curable coating compositions described herein may include a conductive site capable of reducing the static charge held by the reacted acrylates in the final cured coating. The conductive site may allow for the dispersion of static charge, rather than allowing static electricity to build up at the surface of the coating.

The UV curable coating compositions described herein may include acrylate compounds having chemical groups with free valence electrons, such as a metal, metal salt, or highly conjugated organic compounds such as carbon black and polypyrrole, that may increase the movement of electrically charged particles (and conductivity) which may reduce buildup of static charge. In some embodiments, the acrylate compounds of the UV curable coating compositions described herein include non-ionic phosphate backbones, which have a high level of electron resonance and movement. Other possible organic groups may include ionic phosphates, sulfates, or other chemically charged organic molecules. Non-ionic sulfates and other highly conjugated compounds may also be used as a possible conductive subunit as well.

In some embodiments, the UV curable coating compositions described herein utilize diacrylates that may have a conductive site that lowers static charge and remains clean/colorless as a result of the presence of a conductive site. The conductive site may be, for example, a conductive phosphoryl diacrylate-center. The diacrylates used herein may also result in the beneficial property of being cured into the coating, which may prevent their migration out of the coating.

In some embodiments, a suitable acrylate monomer with a conductive site may include an acrylate having a phosphate group conductive site, such as bis[2-(methacryloyloxy)ethyl phosphate]; 2-[hydroxy(2-prop-2-enoyloxy-ethoxy)phosphoryl]oxyethylprop-2-enoate (CAS #40074-34-8); phosphinylidynetris(oxyethylene) triacrylate (CAS #35057-49-9); or 2-(2-methylprop-2-enoyloxy)ethoxy-oxido-oxophosphanium (CAS #15458-75-0), for example. Other (meth)acrylate compounds that have a conductive site may also be used.

In other embodiments, the acrylate monomer may have a sulfate conductive site. Such sulfate conductive sites are present in such compounds as 2-sulfoethyl acrylate (CAS #40074-09-7), 2-sulfoethyl methacrylate (CAS #1095-80-9) and 2-[2-(methacryloyloxy)ethylsulfonyl]acetic acid (CAS #289892-99-5).

The formulations disclosed herein may also include a solvent, a photoinitiator, and/or a flow additive, as described below. In some configurations, an oxygen scavenger may also be used. Oxygen scavengers may be used with UV curable coating compositions to inhibit the radical polymerization process, which can cause the final coating to either require significantly more photoinitiator or lead to incomplete curing. Many known oxygen scavengers can be used, including ascorbic acid, iron powder, sodium hydrogen carbonate, glucose oxidase, iron salts, etc. In one configuration, an oxygen scavenger, such as 1-vinyl-2-pyrrolidinone (also known as n-vinylpyrrolidinone) at a concentration of less than 1% of the total formulation, may be used to allow the curing process to happen more quickly.

Solvents

The UV curable coating compositions disclosed herein may also include a solvent. In some embodiments, the solvent may be present at a concentration ranging from about 10% to about 65% by weight of the total uncured UV curable coating composition.

Solvent suitable for use in a UV curable coating composition may include, but are not limited to, propylene glycol monomethyl ether acetate (PGMEA), ethanol, acetone, isopropanol, and Dowanol PM.

In embodiments where the solvent is PGMEA, the propylene glycol monomethyl ether acetate may be present in a concentration of from greater than about 0% to about 95% by weight of the total uncured UV curable coating composition. In some embodiments, the propylene glycol monomethyl ether acetate is present in a concentration of from greater than about 0% to about 75% by weight of the total uncured UV curable coating composition. In some embodiments, the propylene glycol monomethyl ether acetate is present in a concentration of from greater than about 20% to about 30% by weight of the total uncured UV curable coating composition.

Photoinitiators

In some embodiments of the present disclosure, the UV-curable coating compositions further comprise a photoinitiator suitable for UV curing of the multi-functional acrylate resin. Photointiators are well known in the art, and any photoinitiator capable of assisting in the cure of the curable composition may be used. In some embodiments, the photoinitiator may be a free radical photoinitiator. Illustrative suitable photoinitiators include phosphine oxides, phenones and their derivatives, benzophenones, carbocyanines and methines, polycyclic aromatic hydrocarbons, such as anthracene or the like, and dyestuffs, such as xanthenes, safranines and acridines. More generally, the photoinitiators may be chemical substances belonging to one of the following major categories: compounds containing carbonyl groups, such as pentanedione, benzil, piperonal, benzoin and its halogenated derivatives, benzoin ethers, anthraquinone and its derivatives, p,p'-dimethylaminobenzophene, benzophenone and the like; compounds containing sulfur or selenium, such as the di- and polysulfides, xanthogenates, mercaptans, dithiocarbamates, thioketones, beta-napthoselenazolines; peroxides; compounds containing nitrogen, such as azonitriles, diazo compounds, diazides, acridine derivatives, phenazine, quinoxaline, quinazoline and oxime esters, for example, 1-phenyl-1,2-propanedione 2-[0-(benzoyl)oxime]; halogenated compounds, such as halogenated ketones or aldehydes, methylaryl halides, sulfonyl halides or dihalides; phosphine oxides and photoinitiator dyestuffs, such as diazonium salts, azoxybenzenes and derivatives, rhodamines, eosines, fluoresceines, acriflavine or the like. Common photoinitiators include 2,2-diethoxyacetophenone, dimethoxyphenylaceto-phenone, phenyl benzoin, benzophenone, substituted benzophenones, phosphine oxides and the like. In specific embodiments, the photoinitiator is benzophenone, 1-hydroxy cyclohexyl phenyl ketone, benzophenone, 2-hydroxy-2-methyl-1-phenyl-1-propanone, methyl ethyl ketone peroxide, 2-hydroxy-1-[4-(2-hydroxyethoxy) phenyl]-2-methyl-1-propanone, methyl benzoylformate, diphenyl (2,4,6-trimethylbenzoyl)phosphine oxide, and/or phenylbis(2,4,6-trimethylbenzoyl)phosphine oxide.

It is also possible to use mixtures of photoinitiators. For example, such mixtures may include combinations of camphorquinone; benzophenone; benzophenone derivatives (e.g. 1-[4-(4-benzoyl-phenylsulfanyl-phenyl]-2-methyl-2-(toluene-4-sulfonyl)-propan-1-one); acetophenone, acetophenone derivatives, for example, alpha-hydroxycycloalkyl phenyl ketones or dialkoxyacetophenones; alpha-hydroxy- or alpha-amino-acetophenones, for example, oligo-[2-hydroxy-2-methyl-1-[4-(1-methylvinyl)-phenyl]-propanone], 2-hydroxy-2-methyl-1-phenyl-1-propanone, 2-hydroxy-1-[4-(2-hydroxy-ethoxy)-phenyl]-2-methyl-propan-1-one, 2-methyl-1-[4-(methylthio)phenyl]-2-(4-morpholinyl)-propan-1-one, 2-dimethylamino-2-(4-methylbenzyl)-1-(4-morpholin-4-yl-phenyl)-butan-1-on-e, 2-benzyl-2-dimethylamido-1-(3,4-dimethoxy-phenyl)-butan-1-one, 2-benzyl-2-dimethylamino-1-(4-morpholin-4-yl-phenyl)-butan-1-one, 2-methyl-1-(4-methylsulfanyl-phenyl)-2-morpholin-4-yl-propan-1-one; 1-hydroxy-cyclohexylphenylketone; 4-aroyl- 1,3-dioxolanes; benzoin alkyl ethers and benzil ketals, for example, benzil dimethyl ketal, phenyl glyoxalates and derivatives thereof, for example, methylbenzoyl formate; dimeric phenyl glyoxalates, for example, oxo-phenyl-acetic acid 2-[2-(2-oxo-2-phenyl-acetoxy)-ethoxy]-ethyl ester; peresters, for example, benzophenone-tetracarboxylic acid perestels, as described, for example, in U.S. Pat. Nos. 4,777,191 and 4,970,244 which are incorporated herein by reference in their entireties; monoacylphosphine oxides, for example, (2,4,6-trimethylbenzoyl)-diphenyl-phosphine oxide or phenyl-(2,4,6-trimethylbenzoyl)-phosphinic acid ethyl ester, bisacylphosphine oxides, for example, bis(2,6-dimethoxybenzoyl)-(2,4,4-trimethyl-pent-1-yl)phosphine oxide, phenylbis(2,4,6-trimethylbenzoyl)-phosphine oxide or bis(2,4,6-trimethylbenzoyl)-(2,4-dipentoxyphenyl)phosphine oxide, trisacylphosphine oxides; halomethyltriazines, for example, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxy-phenyl)-4,6-bis-trichloromethyl-[1,3,5]triazine, 2-methyl-4,6-bis-trichloromethyl-[1,3,5]triazine; hexaarylbisimidazole/coinitiator systems, for example, ortho-chlorohexaphenyl-bisimidazole together with 2-mercaptobenzthiazole; ferrocenium compounds or titanocenes, for example, dicyclopentadienyl bis(2,6-difluoro-3-pyrrolo-phenyl)titanium; and borate photoinitiators or O-acyloxime photoinitiators as described, for example, in U.S. Pat. No. 6,596,445. In some embodiments, suitable photoinitiators can be chosen from one or more of the following: benzophenone, benzoin, 2-hydroxy-2-methyl-1-phenylpropan-1-one, dimethoxyphenyl acetophenone, 1-hydroxy cyclohexyl phenyl ketone, and 2,4,6-trimethylbenzoyl diphenyl phosphine oxide, diethoxyacetophenone, and mixtures thereof. In some embodiments, the photoinitiator is 2,2-diethoxyacetophenone (DEA). In some more specific embodiments of UV curable coating compositions, the photoinitiator may include or more of phenylbis(2,4,6-trimethylbenzoyl)-phosphine oxide, 1-hydroxy-cyclohexylphenylketone, 2-hydroxy-2-methyl-1-phenyl-1-propanone, and a phosphine derivative. In embodiments where UV pulse light technology may be used to cure a UV curable coating composition, the photoinitiator of the UV curable coating composition may include a combination of phenylbis(2,4,6-trimethylbenzoyl)-phosphine oxide and 1-hydroxy-cyclohexylphenylketone.

In some embodiments, the amount of photoinitiator in the UV curable coating composition ranges from about 0.5% to about 8% by weight of the total uncured UV curable coating composition. In other embodiments, the amount of photoinitiator ranges from about 0.05% to about 8% by weight of the total uncured UV curable coating composition. In some embodiments, the photoinitiator is present at a concentration ranging from about 2% to about 6% by weight of the total uncured UV curable coating composition. In other more specific embodiments, the amount of photoinitiator ranges from about 2% to about 3% by weight of the of the total uncured UV curable coating composition.

Surfactants and Flow/Leveling Additives

The UV curable coating compositions described herein may also include a flow/level additive for the purpose of promoting smooth application and leveling to provide a consistent thickness and smooth appearance. Any suitable flow/leveling additive compatible with acrylate based formulations may be used. For example, the flow/leveling additive TEGO Flow 460N may be used.

In some embodiments, the flow/leveling additive may be present at a concentration of from greater than about 0% to about 10% by weight of the total uncured UV curable coating composition. In some embodiments, the flow/leveling additive may be present at a concentration of from greater than about 0.5% to about 3% by weight of the total uncured UV curable coating composition. In some embodiments, the flow/leveling additive may be present at a concentration of from greater than about 0.5% to about 1% by weight of the total uncured UV curable coating composition.

Adhesion Promoters

In some embodiments, the UV curable coating composition may further comprise an adhesion promoter to enhance adherence of the UV curable coating composition to a substrate.

In some embodiments, the adhesion promoter is comprised of a compound having a siloxane group and a reactive acrylate group. In some embodiments, the adhesion promoter component of the composition may also include a non-aqueous solvent and water (for the hydrolysis). In some embodiments, the adhesion promoter is selected from 3-(trimethoxysilyl)propyl acrylate, 3-(acryloyloxy)propyl-triethoxysilane, methacryloxypropyltriisopropoxysilane, or 3-(trimethoxysilyl)propyl methacrylate, or combinations of two or more thereof. In some embodiments, the adhesion agent is 3-(trimethoxysilyl)propyl methacrylate.

In some embodiments, the adhesion promoter, such as 3-(trimethoxysilyl)propyl methacrylate, may be present in a concentration ranging from greater than about 0% to about 30% by weight of the total UV curable coating composition. In some embodiments, the adhesion agent, such as 3-(trimethoxysilyl)propyl methacrylate, may be present in a concentration ranging from about 0.5% to about 8% by weight of the total UV curable coating composition. In some embodiments, the adhesion agent, such as 3-(trimethoxysilyl)propyl methacrylate, may be present in a concentration ranging from about 5% to about 4% by weight of the total UV curable coating composition.

In some embodiments, the water may be present in a concentration ranging from greater than about 0% to about 60% by weight of the total UV curable coating composition. In some embodiments, the water may be present in a concentration ranging from about 0.5% to about 1% by weight of the total UV curable coating composition.

In some embodiments, the acetic acid may be present in a concentration ranging from greater than about 0% to about 10% by weight of the total UV curable coating composition. In some embodiments, the acetic acid may be present in a concentration ranging from greater than about 0% to about 2% by weight of the total UV curable coating composition. In some embodiments, the acetic acid may be present in a concentration ranging from about 0.5% to about 1% by weight of the total UV curable coating composition.

Experimental Results

Contact Angle and Hysteresis

Table 1 below describes experimental results of various formulations of the UV curable coating compositions described herein. Experiment 1 illustrates a basic formulation comprising an acrylate (TMPTA), photoinitiator (DEAP), and solvent (PGMEA). The contact angles and hysteresis for a cured coating formed from this UV curable coating composition are shown in Table 2. Experiment 2 illustrates a formulation of UV curable coating composition comprising an acrylate (TMPTA), photoinitiator (DEAP), and fluorinated compound (FluorAcryl 7298®, or FA7298). The experimental data for the cured coating formed by this UV curable coating composition shows no real improvement in contact angles or hysteresis. However, Experiment 3 shows that adding the solvent (PGMEA) to the UV curable coating composition allows the FA7298 to migrate toward the surface of the cured coating, creating a high concentration of fluorine molecules at the surface of the cured coating. The cured coating formed by this UV curable coating composition formulation shows dramatic improvements in contact angles for all 5 tested compounds and improved hysteresis for most of the compounds. Contact angles are much more reliable than hysteresis due to the higher accuracy of the contact angle measurement methods. Experiments 4, 5, and 6 illustrate the results for cured coatings formed by UV curable coating compositions having increasing concentrations of FA7298, resulting in contact/hysteresis angles that are not significantly improved relative to Experiment 3 by having a greater number of fluorine molecules. The UV curable coating composition used to form the cured coating of Experiment 7 included both BMEP and TF460N; the contact/hysteresis angles of the cured coating were similar to those in Experiment 3; thus, the BMEP and TF460N did not have any negative impact on contact angles and hysteresis.

TABLE 1

Coating Compositions (concentrations by weight %)

| | TMPTA | PGMEA | BMEP | PETA | DEAP | FA7298 | TF460N |
|---|---|---|---|---|---|---|---|
| 1 | 71.18 | 25.51 | 0.00 | 0.00 | 3.30 | 0.00 | 0.00 |
| 2 | 95.56 | 0.00 | 0.00 | 0.00 | 3.54 | 0.90 | 0.00 |
| 3 | 70.65 | 25.13 | 0.00 | 0.00 | 3.27 | 0.95 | 0.00 |
| 4 | 69.86 | 25.04 | 0.00 | 0.00 | 3.21 | 1.89 | 0.00 |
| 5 | 69.15 | 24.72 | 0.00 | 0.00 | 3.23 | 2.90 | 0.00 |
| 6 | 68.37 | 24.63 | 0.00 | 0.00 | 3.16 | 3.84 | 0.00 |
| 7 | 49.39 | 25.63 | 20.98 | 0.00 | 2.49 | 1.02 | 0.50 |
| 8 | 68.54 | 24.39 | 2.98 | 0.00 | 3.17 | 0.92 | 0.00 |
| 9 | 62.93 | 22.39 | 10.93 | 0.00 | 2.91 | 0.85 | 0.00 |
| 10 | 56.73 | 20.18 | 19.70 | 0.00 | 2.63 | 0.76 | 0.00 |
| 11 | 49.42 | 17.58 | 30.04 | 0.00 | 2.29 | 0.66 | 0.00 |
| 12 | 53.92 | 19.39 | 22.87 | 0.00 | 2.46 | 0.91 | 0.45 |
| 13 | 53.71 | 19.31 | 22.78 | 0.00 | 2.41 | 0.90 | 0.89 |
| 14 | 53.46 | 18.98 | 22.89 | 0.00 | 2.42 | 0.91 | 1.35 |
| 15 | 53.53 | 19.01 | 22.33 | 0.00 | 2.42 | 0.91 | 1.80 |
| 16 | 44.18 | 33.04 | 18.75 | 0.00 | 2.25 | 1.35 | 0.44 |
| 17 | 32.45 | 50.67 | 13.85 | 0.00 | 1.68 | 1.03 | 0.33 |
| 18 | 26.48 | 59.52 | 11.56 | 0.00 | 1.35 | 0.83 | 0.27 |
| 19 | 48.26 | 25.09 | 20.56 | 2.16 | 2.44 | 1.00 | 0.48 |
| 20 | 47.24 | 24.56 | 20.12 | 4.24 | 2.39 | 0.98 | 0.47 |
| 21 | 46.26 | 24.05 | 19.70 | 6.22 | 2.34 | 0.96 | 0.46 |
| 22 | 26.19 | 54.43 | 11.17 | 5.87 | 1.53 | 0.54 | 0.26 |
| 23 | 46.14 | 23.97 | 19.63 | 6.51 | 2.33 | 0.96 | 0.46 |
| 24 | 42.09 | 30.65 | 17.91 | 5.94 | 2.13 | 0.87 | 0.42 |
| 25 | 37.97 | 37.44 | 16.15 | 5.36 | 1.92 | 0.79 | 0.38 |
| 26 | 33.86 | 44.21 | 14.41 | 4.78 | 1.71 | 0.70 | 0.34 |
| 27 | 29.45 | 51.47 | 12.53 | 4.15 | 1.49 | 0.61 | 0.29 | a. TMPTA = Trimethylol propane triacrylate
b. PGMEA = Propylene glycol monomethyl ether acetate
c. BMEP = Bis[2-(methacryloyloxy)ethyl phosphate]
d. DEAP = 2,2-Diethoxyacetophenome
e. FA7298 = FluorAcryl 7298
f. TF460N = TEGO Flow 460N
g. PETA = pentaerythritol tetraacrylate

TABLE 2

Contact Angles and Hysteresis Angles

| | Water | | Di-iodo | | N-dodecane | | Dimethyl polysiloxane | | Artificial Finger Print | |
|---|---|---|---|---|---|---|---|---|---|---|
| Experiment # | CA | H | CA | H | CA | H | CA | H | CA | H |
| 1 | 76.47 | >80 | 35.23 | 23 | <5 | >80 | <5 | >80 | 14.67 | >80 |
| 2 | 79.44 | >80 | 42.61 | 21 | <5 | >80 | <5 | >80 | 15.73 | >80 |
| 3 | 107.91 | >80 | 93.32 | 5 | 51.78 | >80 | 45.61 | 12 | 67.73 | 40 |
| 4 | 106.98 | >80 | 94.65 | 8 | 54.52 | >80 | 45.22 | 19 | 66.07 | >80 |
| 5 | 106.06 | >80 | 85.67 | 5 | 52.28 | 50 | 44.51 | 13 | 66.3 | 63 |
| 6 | 104.48 | >80 | 89.91 | 7 | 52.82 | >80 | 45.64 | 11 | 61.89 | 78 |
| 7 | 104.03 | >80 | 91.64 | 28 | 55.51 | 42 | 49.19 | 10 | 72.43 | 45 |

Improved Coating Formulations

Experiments 8-11 provide additional formulations with increasing concentrations of the phosphate diacrylate BMEP, ranging from 2.98% to 30.04% of the total uncured UV curable coating composition, which resulted in stable coatings exhibiting anti-static properties. Although CA/H measurements were not performed for Experiments 8-11, CA/H measurements were performed for 0% BMEP (Experiments 1-7) and 20.98% BMEP (Experiment 7), which indicate that the CA/H measurements do not significantly change with BMEP concentration.

Experiments 12-15 modify the concentration of TEGO Flow460N at concentrations ranging from 0.45-1.8% by weight of the total uncured UV curable coating composition. Experiment 7 describes a formulation having 0.50% TEGO Flow460N with acceptable leveling and flow properties of the uncured UV curable coating composition. Amounts of TEGO Flow460N greater than 0.50% thus do not show improved leveling and flow properties. Accordingly, lower concentration of 0.50% TEGO Flow appears to be suitable, with higher concentrations (and higher cost) unnecessary.

Experiments 16-18 compared the dilution of the formulation using PGMEA solvent at concentrations ranging from 33.04% to 59.52%, to determine an optimal film thickness on ABS that exhibited at least 3H pencil scratch/gouge harness. The minimum thickness to obtain a 3H pencil scratch/gouge hardness was found to be from 10-15 microns on ABS, which correlated to 25.63% PGMEA by weight (without a tetraacrylate) of the total uncured UV curable coating composition.

Abrasion and Pencil Scratch/Gouge Hardness Improvement

Improvements to abrasion resistance were measured by comparing Experiment 7 (no tetraacylrate) to Experiments 19-21 (using tetraacrylate PETA). These experiments show that an increasing amount of PETA correlates to improved abrasion resistance (decrease delta haze after abrasion), but the benefits start to level off at about 6% PETA by weight of the total uncured UV curable coating composition. Experiments 19-21 have an approximate thickness of 13 microns. Experiments 21 and 23 are very nearly identical, indicating by extrapolation that the thickness for Experiment 21 is around 13 microns, the same thickness as Experiment 23.

TABLE 3

| Experiment # | Initial Haze | Haze After Abrasion | Delta Haze |
|---|---|---|---|
| 7 | 0.52% | 10.66% | 10.14% |
| 19 | 0.48% | 6.27% | 5.79% |
| 20 | 0.65% | 5.29% | 4.64% |
| 21 | 0.56% | 4.58% | 4.02% |

Linear abrasion with CS10F Eraser, 500 g weight, 25 passes

Another characteristic of adding PETA is a dramatic improvement in pencil scratch/gouge hardness, while also being much thinner (shown in Table 4 below). Experiments 23-27 were continuously diluted using the solvent PGMEA to try and find the thinnest possible coating that still had a pencil scratch hardness of 3H on ABS. The hardness was also measured on soda lime glass and showed improvements over Experiment 7 that had no tetraacylate. A UV curable acrylate having a hardness of 8H and only 6 microns thick represents a significant and unexpected improvement over known acrylate-based coatings.

TABLE 4

| Experiment # | Thickness | Gouge Hardness (ABS) | Scratch Hardness (ABS) | Gouge Hardness (Soda-Lime Glass) | Scratch Hardness (Soda-Lime Glass) |
|---|---|---|---|---|---|
| 7 | 15 μm | 5H | 3H | 10H | 5H |
| 23 | 13 μm | 7H | 2H | 8H | 7H |
| 24 | 11 μm | 8H | 3H | 10H+ | 6H |
| 25 | 6 μm | 8H | 3H | 10H+ | 8H |
| 26 | 5 μm | 10H+ | 3H | 10H+ | 4H |
| 27 | 3 μm | 8H | 3H | 10H+ | 5H |

One-Part Formulations with Primer Included

One-part formulations were prepared that adhered well to glass without a separate primer solution, as described below in Table 5.

TABLE 5

Experimental Chemical Concentration (by weight %)

| | TMPTA | PGMEA | BMEP | PETA | DEAP | FA7298 | TF460N | TMSPMA | Water | Acetic Acid | Acetone |
|---|---|---|---|---|---|---|---|---|---|---|---|
| 1 | 45.52 | 23.65 | 19.42 | 0.00 | 2.32 | 0.94 | 0.00 | 2.96 | 4.29 | 0.90 | 0.00 |
| 2 | 45.31 | 23.55 | 19.33 | 0.00 | 2.30 | 0.94 | 0.46 | 2.95 | 4.27 | 0.90 | 0.00 |
| 3 | 47.17 | 0.00 | 20.12 | 0.00 | 2.40 | 0.98 | 0.00 | 3.07 | 4.45 | 0.93 | 20.89 |
| 4 | 46.95 | 0.00 | 20.02 | 0.00 | 2.39 | 0.97 | 0.47 | 3.06 | 4.43 | 0.93 | 20.79 |

I claim:

1. A UV curable composition for forming a polymeric coating on a substrate, comprising:
    an optically clear colorless UV curable base comprising a combination of one ormore multifunctional polymer precursor and a fluorinated polymer precursor;
    wherein one or more of the multifunctional polymer precursor and fluorinated polymer precursor has a non-charged electrically conductive site sufficient to disperse a static charge from the surface of the polymeric coating;
    wherein a diacrylate monomer is present at a concentration of from greater than 0% to about 50% by weight of the total composition;
    a triacrylate monomer is present at a concentration of from greater than 0% to about 90% by weight of the total composition; and
    a fluorinated acrylate monomer is present at a concentration of from greater than 0% to about 20% by weight of the total composition.

2. The UV curable composition according to claim 1, wherein the optically clearcolorless UV curable base is an acrylate monomer.

3. The UV curable composition according to claim 1, wherein the non-charged electrically conductive site is chosen from at least one of a phosphate group and a sulfate group.

4. The UV curable composition according to claim 1, wherein the one or more multifunctional polymer precursor is the diacrylate monomer.

5. The UV curable composition according to claim 4, wherein the diacrylate monomer is chosen from at least one of bis[2-(methacryloyloxy)ethyl phosphate]; 2-[hydroxy(2-prop-2-enoyloxyethoxy)phosphoryl]oxyethylprop-2-enoate; phosphinylidynetris(oxyethylene) triacrylate; 2-(2-methylprop-2-enoyloxy)ethoxy-oxido-oxophosphanium; and 2-[2-(methacryloyloxy)ethylsulfonyl]acetic acid.

6. The UV curable composition according to claim 4, wherein the diacrylate monomer is bis[2-(methacryloyloxy) ethyl phosphate].

7. The UV curable composition according to claim 1, wherein the multifunctional polymer precursor comprises at least one of a diacrylate, triacrylate and tetraacrylate.

8. The UV curable composition according to claim 1, wherein
    a diacrylate monomer is present at a concentration of from about 0.5% to about 35% by weight of the total composition;
    a triacrylate monomer is present at a concentration of from about 10% to about 65% by weight of the total composition; and a fluorinated acrylate monomer is present at a concentration of from greater than about 0.5% to about 5% by weight of the total composition.

9. The UV curable composition according to claim 1, wherein
a diacrylate monomer is present at a concentration of from greater than 15% to about 25% by weight of the total composition;
a triacrylate monomer is present at a concentration of from greater than 40% to about 50% by weight of the total composition; and
a fluorinated acrylate monomer is present at a concentration of from greater than 0.5% to about 2% by weight of the total composition.

10. The UV curable composition according to claim 1, further comprising an adhesion promoter compound having an alkoxysilane group and an acrylate group.

11. The UV curable composition according to claim 10, further comprising an adhesion promoter chosen from 3-(trimethoxysilyl)propyl acrylate, 3-(acryloyloxy)propyltriethoxysilane, methacryloxypropyltriisopropoxysilane, or 3-(trimethoxysilyl)propyl methacrylate, or combinations thereof, in an aqueous acid solution.

12. The UV curable composition according to claim 11, wherein the adhesion promoter is 3-(trimethoxysilyl)propyl methacrylate compound in an aqueous acid solution.

13. The UV curable composition according to claim 1, further comprising a solvent, the solvent comprising at least one of a propylene glycol methyl ether, ethanol, acetone, and isopropanol.

14. The UV curable composition according to claim 13, wherein the solvent is propylene glycol monomethyl ether acetate (PGMEA).

15. The UV curable composition according to claim 13, wherein the solvent is present at a concentration ranging from about 37% to about 51% by weight of a total uncured composition.

16. The UV curable composition according to claim 13, wherein the coating has a thickness of from about 3 microns to about 6 microns and a pencil hardness of greater than about 4H.

17. The UV curable composition according to claim 13, wherein the coating has a thickness of about 6 microns and a pencil hardness of greater than about 8H on a glass substrate.

18. A UV curable composition comprising about 25 to about 35 percent by weight trimethylol propane triacrylate, about 15 to about 55 percent by weight propylene glycol monomethyl ether acetate, about 10 percent to about 15 percent by weight bis[2-(methacryloyloxy)ethyl phosphate], about 0.5 to about 4 percent by weight 2,2-diethoxyacetophenome, about 0.5 percent to about 2 percent by weight FluorAcryl 7298, about 0.2 to about 2 percent by weight TEGO Flow 460N and about 2 to about 6 percent by weight pentaerythritol tetraacrylate.

19. A UV curable composition for forming a polymeric coating on a substrate, comprising:
an optically clear colorless UV curable base comprising a combination of one ormore multifunctional polymer precursor and a fluorinated polymer precursor;
wherein one or more of the multifunctional polymer precursor and fluorinated polymer precursor has a non-charged electrically conductive site sufficient to disperse a static charge from the surface of the polymeric coating
further comprising an adhesion promoter compound having an alkoxysilane group and an acrylate group.

* * * * *